US012123167B2

(12) United States Patent
Kunizawa et al.

(10) Patent No.: US 12,123,167 B2
(45) Date of Patent: Oct. 22, 2024

(54) WORKING MACHINE

(71) Applicant: KUBOTA CORPORATION, Osaka (JP)

(72) Inventors: Teruo Kunizawa, Osaka (JP); Kiyoshi Matsui, Osaka (JP); Junki Ito, Osaka (JP); Haruhito Ikeda, Osaka (JP); Hisayuki Hiramatsu, Osaka (JP); Satoshi Osaki, Osaka (JP); Atsushi Matsumoto, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 141 days.

(21) Appl. No.: 17/831,905

(22) Filed: Jun. 3, 2022

(65) Prior Publication Data

US 2022/0298745 A1     Sep. 22, 2022

Related U.S. Application Data

(63) Continuation of application No. PCT/JP2020/048556, filed on Dec. 24, 2020.

(30) Foreign Application Priority Data

Dec. 25, 2019  (JP) ................................. 2019-234507
Dec. 25, 2019  (JP) ................................. 2019-234508
May 13, 2020  (JP) ................................. 2020-084704

(51) Int. Cl.
*E02F 9/08*       (2006.01)
*E02F 9/20*       (2006.01)
(Continued)

(52) U.S. Cl.
CPC .......... *E02F 9/0883* (2013.01); *E02F 9/2066* (2013.01); *E02F 9/26* (2013.01);
(Continued)

(58) Field of Classification Search
CPC ......... E02F 9/0883; E02F 9/2066; E02F 9/26; F02D 19/022; F02D 19/023; F02D 19/0967

See application file for complete search history.

(56) References Cited

U.S. PATENT DOCUMENTS 4,344,479 A  *  8/1982  Bailey ...................... F23C 9/00
                                                    165/DIG. 321
8,958,972 B1 *  2/2015  Fisher ..................... B61C 17/02
                                                         701/22
(Continued)

FOREIGN PATENT DOCUMENTS

JP        2006-44401       2/2006
JP        2008-274894      11/2008
(Continued)

OTHER PUBLICATIONS

International Search Report and Written Opinion of the International Searching Authority issued in International Application No. PCT/JP2020/048556, dated Mar. 23, 2021, along with English translation thereof.

(Continued)

*Primary Examiner* — John Kwon
(74) *Attorney, Agent, or Firm* — Greenblum & Bernstein, P.L.C.

(57)   ABSTRACT

A working machine includes: a machine body; a prime mover that is mounted on the machine body; a fuel cylinder that contains a fuel; a vaporizer that vaporizes the fuel sent from the fuel cylinder and supplies the fuel to the prime mover; a temperature detector that detects a temperature correlating with a decrease in the temperature of the vaporizer; and a controller that imposes restraint on the flow rate of the fuel flowing from the vaporizer to the prime mover (Continued)

when the temperature detected by the temperature detector is lower than or equal to a first temperature.

20 Claims, 9 Drawing Sheets

(51) Int. Cl.
*E02F 9/26* (2006.01)
*F02D 19/02* (2006.01)
*F02D 29/04* (2006.01)

(52) U.S. Cl.
CPC ......... *F02D 19/022* (2013.01); *F02D 19/027* (2013.01); *F02D 29/04* (2013.01)

(56) References Cited

U.S. PATENT DOCUMENTS

| | | | |
|---|---|---|---|
| 2011/0214644 A1 | 9/2011 | Barta et al. | |
| 2014/0369890 A1* | 12/2014 | Hirabayashi | F01N 3/206 422/119 |
| 2015/0120166 A1* | 4/2015 | Fisher | B61C 17/02 701/1 |
| 2016/0017835 A1* | 1/2016 | Garner | F02M 21/0224 123/458 |
| 2016/0108857 A1* | 4/2016 | Kanafani | F01P 7/14 123/294 |
| 2016/0290297 A1* | 10/2016 | Batenburg | F02D 19/023 |
| 2016/0351927 A1 | 12/2016 | Edgar | |

FOREIGN PATENT DOCUMENTS

| | | |
|---|---|---|
| JP | 2009-105023 A | 5/2009 |
| JP | 2010-7595 | 1/2010 |
| JP | 2012-209240 A | 10/2012 |
| JP | 2017-66787 | 4/2017 |
| JP | 2017512362 A | 5/2017 |

OTHER PUBLICATIONS

Office Action issued Sep. 5, 2023 in corresponding Japanese family member application No. 2020-084704 and English language translation thereof.
Supplementary Partial European Search Report issued Dec. 8, 2023 in corresponding European family member application No. 20908325.2.

* cited by examiner

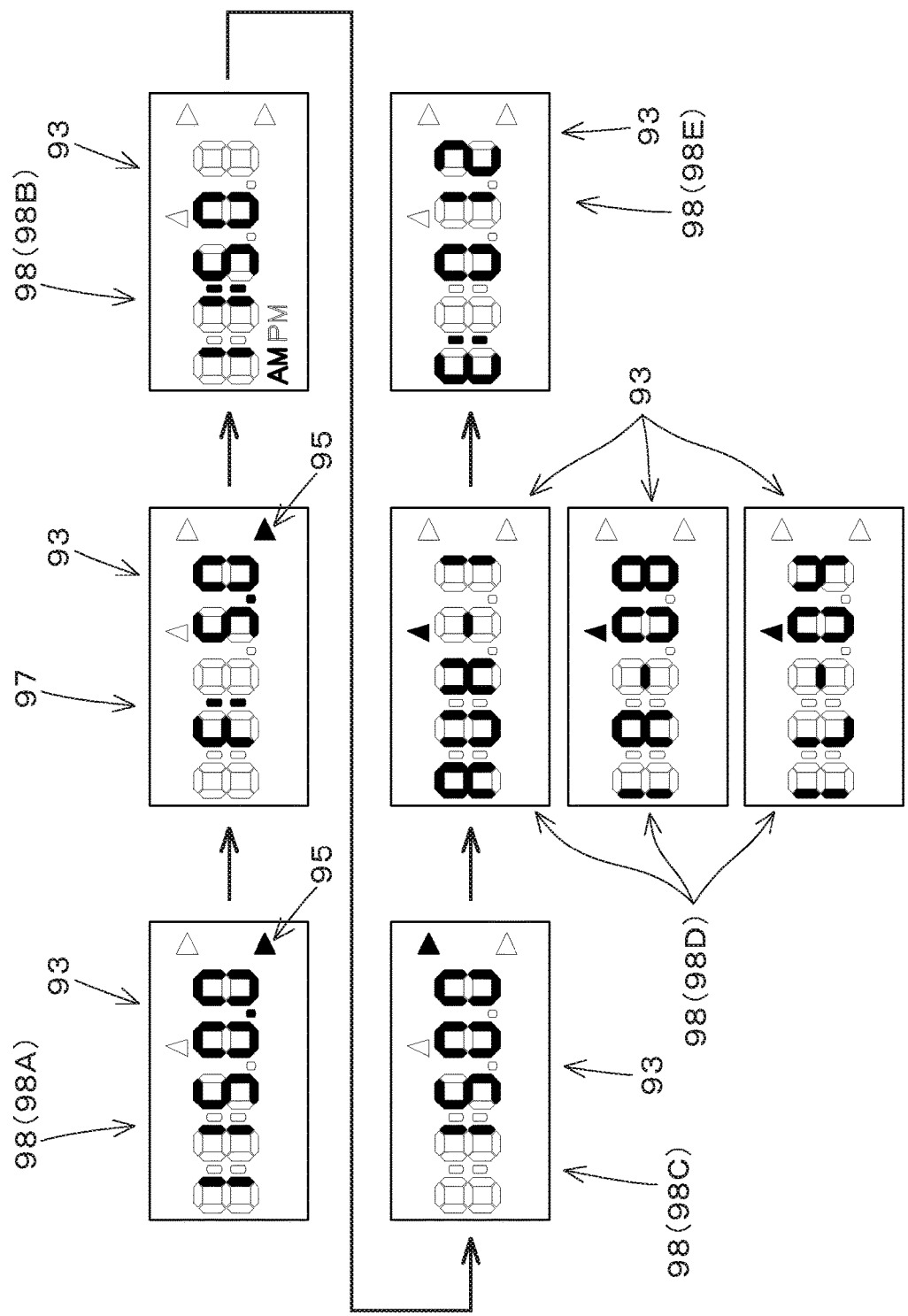

WORKING MACHINE

CROSS REFERENCE TO RELATED APPLICATIONS

This application is a continuation application of International Application No. PCT/JP2020/048556, filed on Dec. 24, 2020, which claims the benefit of priority to Japanese Patent Application No. 2019-234507, filed on Dec. 25, 2019, to Japanese Patent Application No. 2019-234508, filed on Dec. 25, 2019, and to Japanese Patent Application No. 2020-084704, filed on May 13, 2020. The entire contents of each of these applications are hereby incorporated herein by reference.

BACKGROUND OF THE INVENTION

1. Field of the Invention

The present invention relates to a working machine.

2. Description of the Related Art

In the related art, a working machine disclosed in Japanese Unexamined Patent Application Publication No. 2017-66787 is known.

The working machine disclosed in Japanese Unexamined Patent Application Publication No. 2017-66787 includes a prime mover mounted on a machine body.

SUMMARY OF THE INVENTION

In a working machine that uses a fuel obtained by compressing and liquefying a gas as the fuel for the prime mover, the fuel is supplied from a fuel cylinder to the prime mover in a liquid state, is heated and vaporized by a vaporizer, and is supplied to the prime mover in a vaporized state.

The vaporizer vaporizes the fuel with the heat of cooling water for the prime mover. Therefore, when the prime mover is in a cold area and cooled, the temperature of the cooling water is low, and the vaporization capability of the vaporizer decreases. When the fuel is vaporized during a cold start while the vaporization capability of the vaporizer is low, the temperature of the vaporizer gradually decreases with the heat of vaporization. When the temperature of the vaporizer decreases below a temperature at which the fuel is vaporized, the fuel is supplied to the prime mover in a liquid state, and the prime mover stalls, which is a problem.

As the fuel to be supplied to the prime mover, a fuel, such as liquefied petroleum gas (LPG), contained in a fuel cylinder can be used. Usually, for a device for which a fuel cylinder is used, replacing the fuel cylinder while the amount of remaining fuel is large is wasteful, and therefore, there is a demand for using up the fuel to the extent possible.

However, it is often the case that fuel cylinders are not provided with a detection device for detecting the amount of remaining fuel. Therefore, to grasp the amount of remaining fuel, a method is possible in which a reserve tank is placed on a fuel supply passage from the fuel cylinder to the engine and a notification is given when the liquid level of the fuel in the reserve tank drops to a predetermined level. This method uses the fact that when the amount of remaining fuel in the fuel cylinder is sufficient, the fuel is supplied from the fuel cylinder to the reserve tank in a liquid state and the reserve tank is filled with the liquid, and when the amount of remaining fuel in the fuel cylinder decreases and the fuel is supplied from the fuel cylinder to the reserve tank in a gas state, the liquid level of the reserve tank drops. In response to detection of the liquid level of the reserve tank dropping to the predetermined level, a notification is given.

However, with the method, it is possible to grasp the liquid level of the reserve tank dropping to the predetermined level but it is not possible to grasp subsequent changes in the amount of remaining fuel, and it is difficult to use up the fuel to the extent possible.

Further, with the method, it is possible to grasp the liquid level of the reserve tank dropping to the predetermined level after replacement of the fuel cylinder but it is not possible to grasp subsequent changes in the amount of remaining fuel.

In view of the above-described problems, the present invention provides a working machine in which the prime mover can be prevented from stalling during a cold start.

Further, the present invention provides a working machine for which the amount of remaining fuel can be grasped after detection of the amount of remaining fuel in the reserve tank reaching a predetermined amount.

Further, the present invention provides a working machine for which changes in the amount of remaining fuel after replacement of the fuel cylinder can be grasped.

A working machine according to an aspect of the present invention includes: a machine body; a prime mover that is mounted on the machine body; a fuel cylinder that contains a fuel; a vaporizer that vaporizes the fuel sent from the fuel cylinder and supplies the fuel to the prime mover; a temperature detector that detects a temperature correlating with a decrease in a temperature of the vaporizer; and a controller that imposes restraint on a flow rate of the fuel flowing from the vaporizer to the prime mover when the temperature detected by the temperature detector is lower than or equal to a first temperature.

Further, the working machine may include a display unit that indicates that the flow rate of the fuel flowing to the prime mover is restrained.

Further, the controller may include a rotation speed limiting unit that limits an upper limit of a rotation speed of the prime mover so as to restrain the flow rate of the fuel flowing to the prime mover.

Further, the controller may include an output limiting unit that limits an output of the prime mover so as to restrain the flow rate of the fuel flowing to the prime mover.

Further, the controller may include a removing unit that removes the restraint when the temperature detected by the temperature detector is higher than or equal to a second temperature that is higher than the first temperature.

Further, the controller may include a removing unit that removes the restraint after an elapse of a predetermined time since starting of the prime mover.

Further, the temperature detector may be a water temperature sensor that detects a temperature of cooling water for the prime mover.

Further, the temperature detector may be a gas temperature sensor that detects a temperature of the fuel vaporized by the vaporizer.

Further, the working machine may include a hydraulic device that is driven by using a hydraulic fluid, in which the temperature detector may be a fluid temperature sensor that detects a temperature of the hydraulic fluid.

Further, the working machine may include: a reserve tank that stores the fuel supplied from the fuel cylinder and that supplies the fuel to the prime mover when an amount of remaining fuel in the fuel cylinder decreases to a predetermined amount or less; a remaining amount sensor that detects a state in which an amount of remaining fuel in the reserve tank reaches a predetermined amount; and a notification unit that gives a notification about a decreasing change in a remaining fuel in a predetermined notification form after the remaining amount sensor has detected the state.

Further, the working machine may include: an elapsed-time totaling unit that totals a driving time of the prime mover after replacement of the fuel cylinder; and a display that is capable of displaying the driving time totaled by the elapsed-time totaling unit.

A working machine according to another aspect of the present invention includes: a machine body; a prime mover that is mounted on the machine body; a fuel cylinder that contains a fuel to be supplied to the prime mover; a reserve tank that stores the fuel supplied from the fuel cylinder and that supplies the fuel to the prime mover when an amount of remaining fuel in the fuel cylinder decreases to a predetermined amount or less; a remaining amount sensor that detects a state in which an amount of remaining fuel in the reserve tank reaches a predetermined amount; and a notification unit that gives a notification about a decreasing change in a remaining fuel in a predetermined notification form after the remaining amount sensor has detected the state.

Further, the notification unit may include a notification control unit that changes the notification form in accordance with a driving time of the prime mover after the remaining amount sensor has detected the state.

Further, the notification unit may include a notification control unit that calculates a fuel consumption after the remaining amount sensor has detected the state and that changes the notification form on the basis of the calculated fuel consumption.

Further, the notification control unit may change the notification form step by step.

Further, the notification unit may include a notification device that emits a warning sound, the notification form may be a form in which the warning sound is periodically made, and the notification control unit may change the notification form by sending to the notification device, a command signal for narrowing intervals at which the warning sound is made, in accordance with a decreasing change in the remaining fuel.

Further, the notification control unit may calculate the fuel consumption on the basis of one or more calculation conditions among an amount of air mixed with the fuel, a rotation speed of the prime mover, an opening of a throttle valve, and an operating time of the prime mover.

Further, the working machine may include a refueling lamp that indicates that the remaining amount sensor has detected the state, in which the notification control unit may make the refueling lamp blink in an initial stage to a stage preceding a last stage in the notification form and may light the refueling lamp in the last stage in the notification form.

A working machine according to yet another aspect of the present invention includes: a machine body; a prime mover that is mounted on the machine body; a fuel cylinder of a replaceable type that contains a fuel to be supplied to the prime mover; an elapsed-time totaling unit that totals a driving time of the prime mover after replacement of the fuel cylinder; and a display that is capable of displaying the driving time totaled by the elapsed-time totaling unit.

Further, the working machine may include a resetting unit that resets the driving time totaled by the elapsed-time totaling unit and display of the driving time.

Further, the working machine may include a reset switch that is operated by an operator, in which the resetting unit may reset the driving time and display of the driving time in response to a predetermined operation being performed on the reset switch.

Further, the display may include a screen display part, the screen display part may be capable of switching display between a time display screen that displays the driving time and at least another display screen other than the time display screen, and the driving time and display of the driving time may be reset by the operator when not the other display screen but the time display screen is displayed.

Further, the elapsed-time totaling unit may total the driving time while a rotation speed of the prime mover is higher than or equal to a predetermined rotation speed.

Further, the working machine may include a retaining unit that retains, in response to a stop of the prime mover, the driving time totaled until the stop, in which the elapsed-time totaling unit may stop totaling the driving time in response to a stop of the prime mover, and may resume totaling of the driving time in response to resumption of driving of the prime mover, with the driving time retained by the retaining unit.

Further, the working machine may include: a reserve tank that stores the fuel supplied from the fuel cylinder and that supplies the fuel to the prime mover when an amount of remaining fuel in the fuel cylinder decreases to a predetermined amount or less; and a remaining amount sensor that detects an amount of remaining fuel in the reserve tank reaching a predetermined amount, in which the resetting unit may reset the driving time and display of the driving time in response to the remaining amount sensor detecting the amount of remaining fuel in the reserve tank being larger than or equal to the predetermined amount after replacement of the fuel cylinder.

Further, the working machine may include: a time setting unit that allows the operator to set a time; and a warning device that issues a warning in a predetermined warning form in response to the driving time totaled by the elapsed-time totaling unit reaching the time set by the time setting unit.

Further, the working machine may include a replacement detector that detects replacement of the fuel cylinder, in which the resetting unit may reset the driving time and display of the driving time in response to detection of replacement of the fuel cylinder.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 9 is a configuration diagram of a screen display part.

DETAILED DESCRIPTION OF THE PREFERRED EMBODIMENTS

Figure 1:
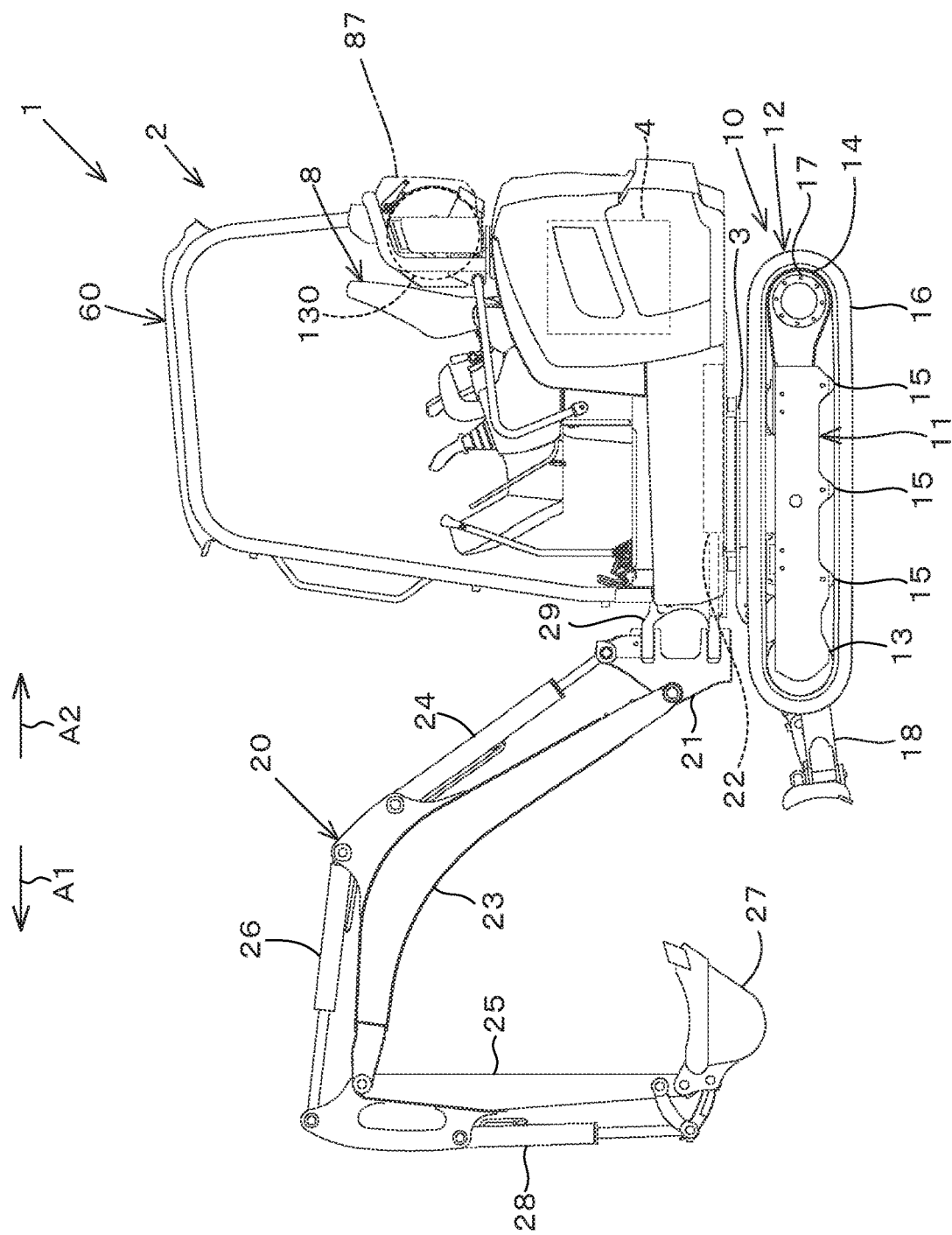
FIG. 1 is a schematic side view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with reference to the drawings as appropriate.

Figure 2:
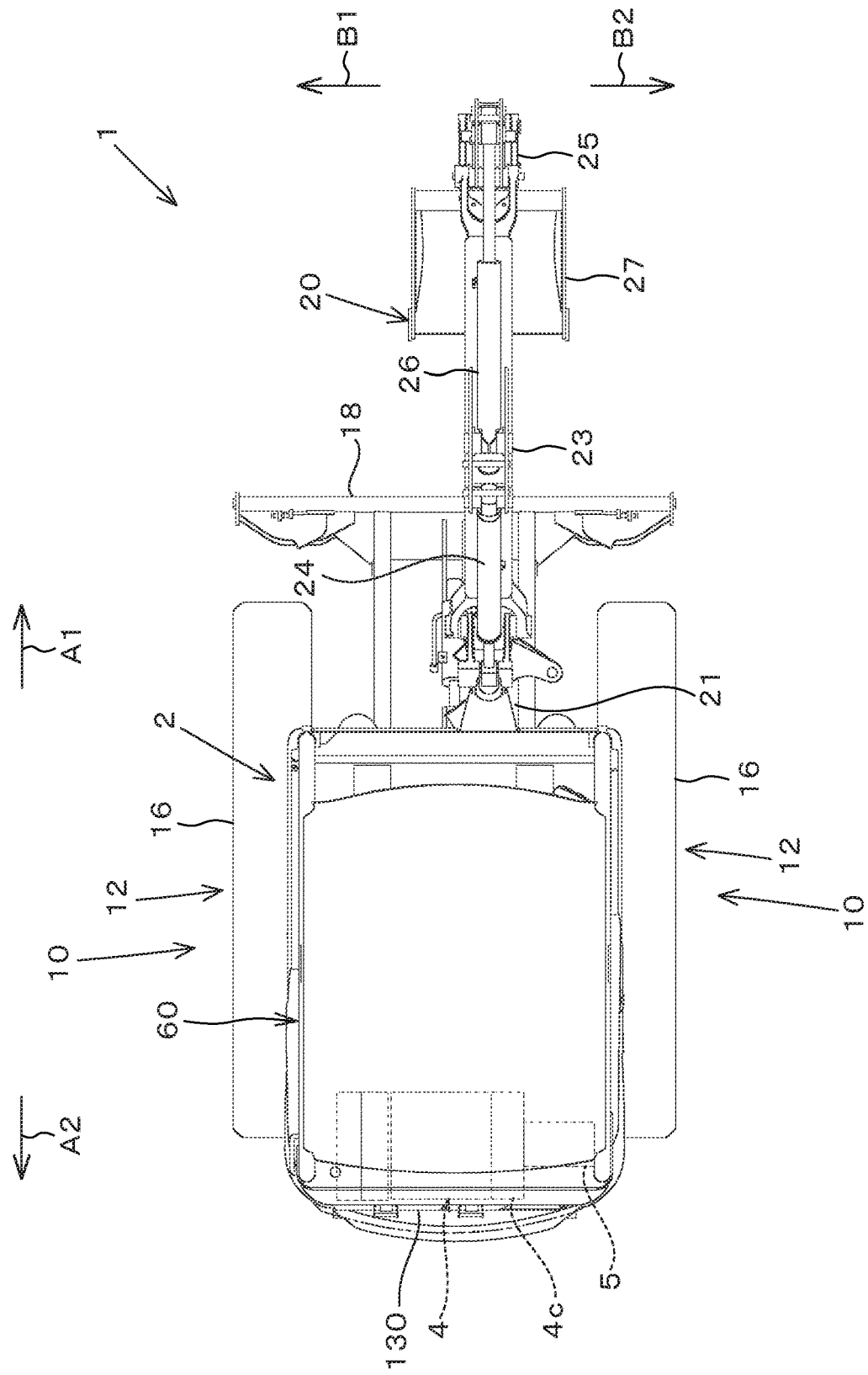
FIG. 2 is a schematic plan view of the working machine.

FIG. 1 is a schematic side view illustrating the overall configuration of a backhoe that is a working machine (turning working machine) 1 according to the present embodiment. FIG. 2 is a schematic plan view illustrating the overall configuration of the turning working machine 1.

Although an example where the present invention is applied to the backhoe that is the working machine 1 will be described in the following embodiment, the present invention is applicable not only to backhoes but also to various working machines including various construction machines, civil engineering machines, and agricultural machines.

As illustrated in FIG. 1, the working machine 1 includes a machine body (turning platform) 2, a traveling device 10, and a working device 20. On the machine body 2, an operator's seat 8 is provided, and the operator's seat 8 is surrounded by a protection mechanism 60.

In the present embodiment, a direction extending forward from an operator sitting on the operator's seat 8 of the working machine 1 (the A1 arrow direction in FIG. 1 and FIG. 2) is defined as a forward direction, a direction extending backward from the operator (the A2 arrow direction in FIG. 1 and FIG. 2) is defined as a backward direction, a direction extending leftward from the operator (the near side of FIG. 1 or the B1 arrow direction in FIG. 2) is defined as a leftward direction, and a direction extending rightward from the operator (the far side of FIG. 1 or the B2 arrow direction in FIG. 2) is defined as a rightward direction, and a description will be given.

Further, a horizontal direction orthogonal to the front-back direction is defined as a machine body width direction (the width direction of the machine body 2), and a description will be given. A direction extending rightward or leftward from the center part of the machine body 2 in the width direction is defined as an outward direction, and a description will be given. In other words, the outward direction is the machine body width direction and extends away from the center of the machine body 2 in the width direction. The direction opposite to the outward direction is defined as an inward direction (inside), and a description will be given. In other words, the inward direction is the machine body width direction and extends closer to the center of the machine body 2 in the width direction.

As illustrated in FIG. 1, the machine body 2 is supported on a traveling frame 11 so as to be rotatable about a vertical axis (an axis extending in the up-down direction) (capable of turning leftward and rightward) with a turn bearing 3 therebetween. The center of the turn bearing 3 is the turn axis (turn center). To the machine body 2, a turn motor (not illustrated) that is a hydraulic motor is fitted. This turn motor is a motor that drives and rotates the machine body 2 about the turn axis.

As illustrated in FIG. 2, the machine body 2 is provided with a prime mover 4 and a hydraulic pump 5. That is, the prime mover 4 is mounted on the machine body 2, and specifically, disposed in the rear of the machine body 2. The prime mover 4 is a spark-ignition engine that can be driven with fuel. The prime mover 4 is an electronically controllable engine. A part (right-hand part) of the prime mover 4 on a second side in the machine body width direction is a flywheel 4c, and the hydraulic pump 5 is coupled to the right of the flywheel 4c. The hydraulic pump 5 is driven by the driving force of the prime mover 4 and outputs a hydraulic fluid (hydraulic pressure) for driving a hydraulic actuator (a hydraulic device driven with the hydraulic fluid) that includes a hydraulic motor and a hydraulic cylinder provided in the working machine 1.

As illustrated in FIG. 1, the traveling device 10 includes the traveling frame 11 and a traveling mechanism 12. The traveling mechanism 12 is, for example, of a crawler type. As illustrated in FIG. 2, the traveling mechanism 12 is provided to the traveling frame 11 on each of a first side (the left side) and the second side (the right side) in the machine body width direction. As illustrated in FIG. 1, the traveling mechanism 12 includes an idler 13, a driving wheel 14, a plurality of track rollers 15, an endless crawler belt 16, and a traveling motor 17 that is a hydraulic motor. The idler 13 is disposed in the front of the traveling frame 11, and the driving wheel 14 is disposed in the rear of the traveling frame 11. The plurality of track rollers 15 are provided between the idler 13 and the driving wheel 14. The crawler belt 16 is wound around the idler 13, the driving wheel 14, and the track rollers 15. The traveling motor 17 drives the driving wheel 14 to thereby move the crawler belt 16 circularly in the circumferential direction. To the front of the traveling device 10, a dozer 18 is fitted.

The working device 20 is provided to the machine body 2. Specifically, the working device 20 is provided at the front of the machine body 2 and operates in response to driving by the prime mover 4. As illustrated in FIG. 1 and FIG. 2, the working device 20 includes a boom 23, an arm 25, and a bucket (working tool) 27. The base end of the boom 23 is pivotally connected to a swing bracket 21 so as to be rotatable about a lateral axis (an axis extending in the machine body width direction). Accordingly, the boom 23 can swing in the up-down direction (vertical direction). The arm 25 is pivotally connected to the distal end of the boom 23 so as to be rotatable about a lateral axis. Accordingly, the arm 25 can swing in the front-back direction or in the up-down direction. The bucket 27 is provided at the distal end of the arm 25 so as to be able to perform shoveling and dumping. The working machine 1 can be fitted with another working tool (hydraulic attachment) that can be driven by a hydraulic actuator instead of or in addition to the bucket 27. Examples of the other working tool include a hydraulic breaker, a hydraulic crusher, an angle broom, an earth auger, a pallet fork, a sweeper, a mower, and a snow blower.

As illustrated in FIG. 1, the swing bracket 21 is supported by a support bracket 29 provided at the front of the machine body 2 and protruding forward, so as to be rotatable about a longitudinal axis. The swing bracket 21 can swing from side to side in response to extension and contraction of a swing cylinder 22 provided on the right side of the machine body 2. The boom 23 can swing in response to extension and contraction of a boom cylinder 24. The arm 25 can swing in response to extension and contraction of an arm cylinder 26. The bucket 27 can perform shoveling and dumping in response to extension and contraction of a bucket cylinder (working tool cylinder) 28. The swing cylinder 22, the boom cylinder 24, the arm cylinder 26, and the bucket cylinder 28 are hydraulic cylinders (hydraulic actuators) and are driven with a hydraulic fluid output by the hydraulic pump 5, that is, in response to driving by the prime mover 4.

As illustrated in FIG. 1 and FIG. 2, the working machine 1 includes a fuel cylinder 130 (fuel container) that contains a fuel. The fuel cylinder 130 is, for example, a bottomed cylindrical container and contains therein a fuel (liquefied fuel gas) in a liquid state obtained by compressing and liquefying a gas. That is, the fuel cylinder 130 is a high-pressure gas container. The fuel cylinder 130 is fitted to the machine body 2 so as to be detachable (replaceable). That is, the working machine 1 of the present embodiment is not the working machine 1 of a type for which the fuel cylinder 130 is replenished with fuel but is the working machine 1 of a type for which the fuel cylinder 130 is replaced when the fuel in the fuel cylinder 130 decreases. The fuel is a fuel for driving the prime mover 4 and is, for example, liquefied petroleum gas (LPG) or liquefied natural gas (LNG). The fuel contained in the fuel cylinder 130 is supplied to a vaporizer 39 through a hose connected to the fuel cylinder 130, is vaporized by the vaporizer 39, and is supplied to the prime mover 4 or an air intake passage of the prime mover 4 by a fuel supply means (not illustrated), such as an injector or a gas mixer. The rear of a space that accommodates the fuel cylinder 130 may be covered by a cover 87.

Figure 3:
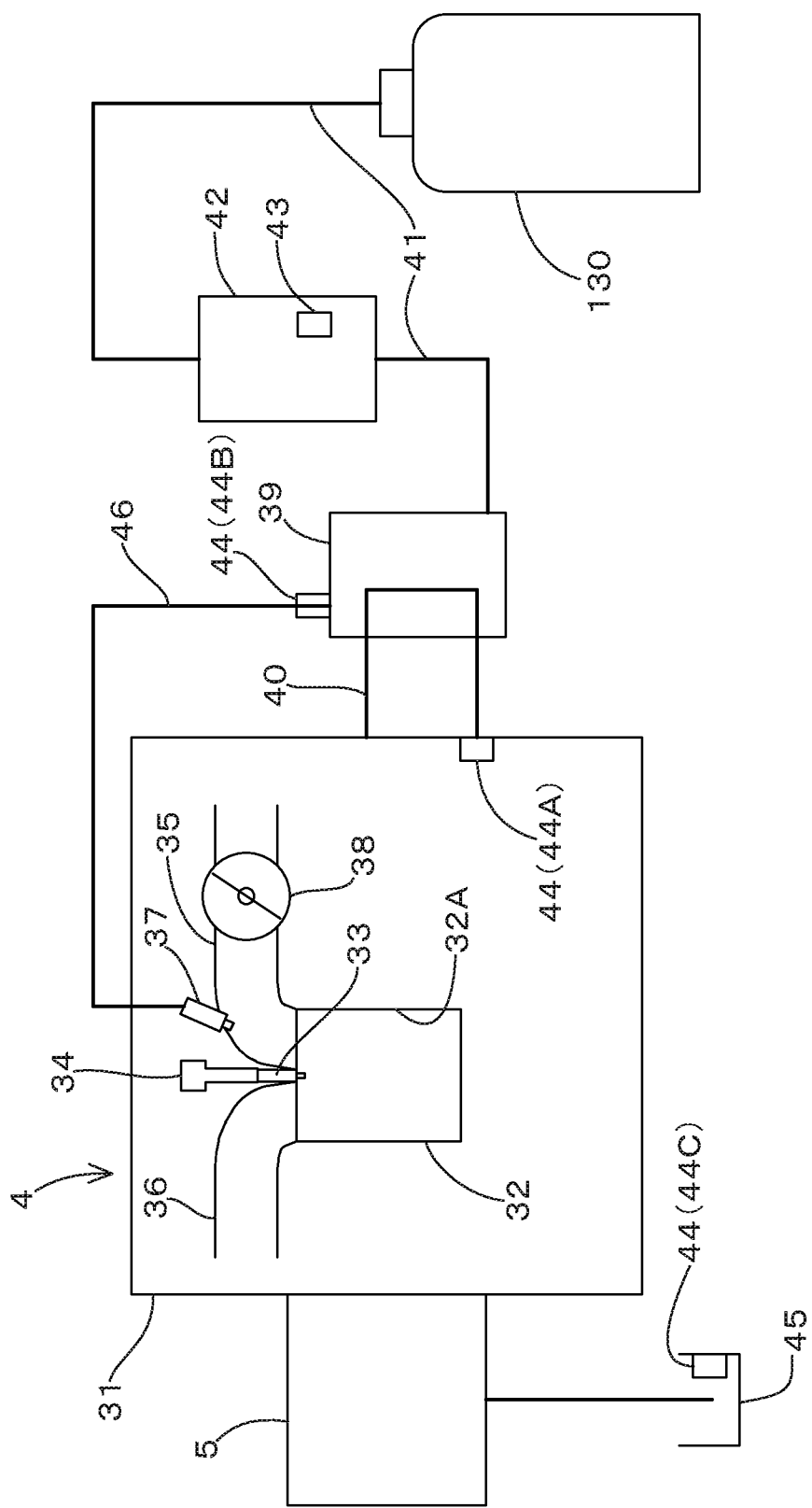
FIG. 3 is a structural diagram illustrating an engine and a fuel supply system.

As illustrated in FIG. 3, the prime mover 4 includes a cylinder 32 provided in a crankcase 31. The interior of the cylinder 32 forms a combustion chamber 32A that is a space in which an air-fuel mixture containing fuel and air burns. To the top of the cylinder 32, an ignition plug 33 that ignites the air-fuel mixture in the combustion chamber 32A is fitted. To the ignition plug 33, an ignition coil 34 is connected. The ignition coil 34 applies a high voltage to the ignition plug 33 to make discharge occur. The ignition plug 33 burns the air-fuel mixture in the combustion chamber 32A with sparks caused by the discharge. That is, the ignition coil 34 controls ignition by the ignition plug 33 and controls the revolution of the prime mover 4.

Although not illustrated, a piston is accommodated in the cylinder 32, a crankshaft that outputs rotational power is connected to the piston with a connecting rod therebetween, the piston reciprocates in the cylinder 32 in response to burning of the air-fuel mixture in the combustion chamber 32A, and the reciprocation motion is converted to a rotational motion and transmitted to the crankshaft through the connecting rod to thereby output the rotational power.

In the crankcase 31, an air intake passage 35 and an exhaust passage 36 connected to the cylinder 32 are provided. Through the air intake passage 35, air taken in through an air cleaner is supplied into the cylinder 32. Through the exhaust passage 36, an exhaust gas generated as a result of burning in the cylinder 32 is discharged to the atmosphere through, for example, a muffler. On the air intake passage 35, a throttle valve 38 is provided. The throttle valve 38 includes, for example, a butterfly valve and regulates the flow rate of the intake air to be taken into the cylinder 32 through the air intake passage 35 by opening or closing the throttle valve 38. On the air intake passage 35, an injector 37 is provided between the throttle valve 38 and the cylinder 32. The injector 37 is a fuel injection device that injects a fuel to the intake air that has passed through the throttle valve 38. The means for supplying the fuel vaporized by the vaporizer 39 to the prime mover 4 need not be the injector 37 and may be another means, such as a gas mixer. Further, the fuel vaporized by the vaporizer 39 may be directly supplied to the prime mover 4 or may be supplied to the air intake passage of the prime mover 4.

As illustrated in FIG. 3, the vaporizer 39 is connected to the injector 37. The vaporizer 39 is connected to the fuel cylinder 130, and vaporizes a fuel sent from the fuel cylinder 130 and supplies the fuel to the prime mover 4 (injector 37). Specifically, the fuel in the fuel cylinder 130 is supplied from the fuel cylinder 130 toward the prime mover 4 in a liquid state, is heated and vaporized by the vaporizer 39, and is supplied to the injector 37 in a vaporized state. The fuel supplied to the injector 37 in a vaporized state is injected through the injector 37, is mixed with air, and is supplied to the combustion chamber 32A.

Cooling water (engine cooling water) for the prime mover 4 passes through the vaporizer 39, and the fuel (for example, LPG) is vaporized with the heat of the engine cooling water. That is, a cooling water circulation passage 40 through which the engine cooling water circulates is connected to the vaporizer 39, and the fuel in a liquid state is heated by the engine cooling water that circulates through the cooling water circulation passage 40.

On a fuel supply passage 41 between the fuel cylinder 130 and the vaporizer 39, a reserve tank 42 is provided. The reserve tank 42 contains (stores) a fuel supplied from the fuel cylinder 130 and supplies the fuel to the prime mover 4 when the amount of remaining fuel in the fuel cylinder 130 decreases to a predetermined amount or less (when the remaining fuel runs low). Even while the fuel is being supplied from the reserve tank 42 to the prime mover 4, the fuel flows from the fuel cylinder 130 to the reserve tank 42. Even when the fuel cylinder 130 becomes empty, the working machine 1 can continue driving by using the fuel in the reserve tank 42. That is, even when the amount of remaining fuel in the fuel cylinder 130 decreases, the working machine 1 can continuously perform an operation without immediately stopping the operation. In the reserve tank 42, a remaining amount sensor 43 that detects a decrease in the fuel in the reserve tank 42 is provided. The remaining amount sensor 43 detects the amount of remaining fuel in the reserve tank 42 reaching a predetermined amount. Specifically, the remaining amount sensor 43 is an optical sensor that detects the liquid level of the fuel in the reserve tank 42. When the liquid level of the fuel in the reserve tank 42 drops below a predetermined level, the optical sensor is exposed to thereby detect the amount of remaining fuel in the reserve tank 42 reaching the predetermined amount. That is, the remaining amount sensor 43 outputs a binary value indicating OFF (indicating that there is a remaining amount) or ON (indicating that there is no remaining amount).

As illustrated in FIG. 3, the working machine 1 includes a temperature detector 44 that detects a temperature correlating with a decrease in the temperature of the vaporizer 39. The detection target of the temperature detector 44 is, for example, the engine cooling water. In this case, the temperature detector 44 is a water temperature sensor 44A that detects the water temperature of the engine cooling water. The engine cooling water is also used to heat the vaporizer 39. Therefore, when the temperature of the engine cooling water is low, the vaporization capability of the vaporizer 39 decreases, and the temperature of the vaporizer 39 gradually decreases with the heat of vaporization of the fuel vaporized by the vaporizer 39. That is, the temperature of the engine cooling water correlates with a decrease in the temperature of the vaporizer 39. The detection target may be the fuel vaporized by the vaporizer 39. In this case, the temperature detector 44 is a gas temperature sensor 44B that detects the temperature of the fuel vaporized by the vaporizer 39. The gas temperature sensor 44B is provided on a gas supply passage 46 that connects the vaporizer 39 and the injector 37 with each other. A low temperature of the fuel vaporized by the vaporizer 39 directly relates to a decrease in the temperature of the vaporizer 39. That is, the temperature of the fuel vaporized by the vaporizer 39 correlates with a decrease in the temperature of the vaporizer 39. The detection target may be a hydraulic fluid. In this case, the temperature detector 44 is, for example, a fluid temperature sensor 44C that detects the temperature of a hydraulic fluid stored in a hydraulic fluid tank 45. The fluid temperature sensor 44C may detect the fluid temperature of a hydraulic fluid that flows through a hydraulic pipe between the hydraulic pump 5 and the hydraulic fluid tank 45. The hydraulic pump 5 is directly connected to the prime mover 4 and is driven by the prime mover 4. During cold hours, a hydraulic fluid is highly viscous and highly resistive because of the low temperature, and therefore, the load of the hydraulic pump 5 is high. Accordingly, a large amount of fuel is injected during a cold start of the prime mover 4, and the temperature of the vaporizer 39 decreases. That is, the fluid temperature of the hydraulic fluid correlates with a decrease in the temperature of the vaporizer 39.

Figure 4:
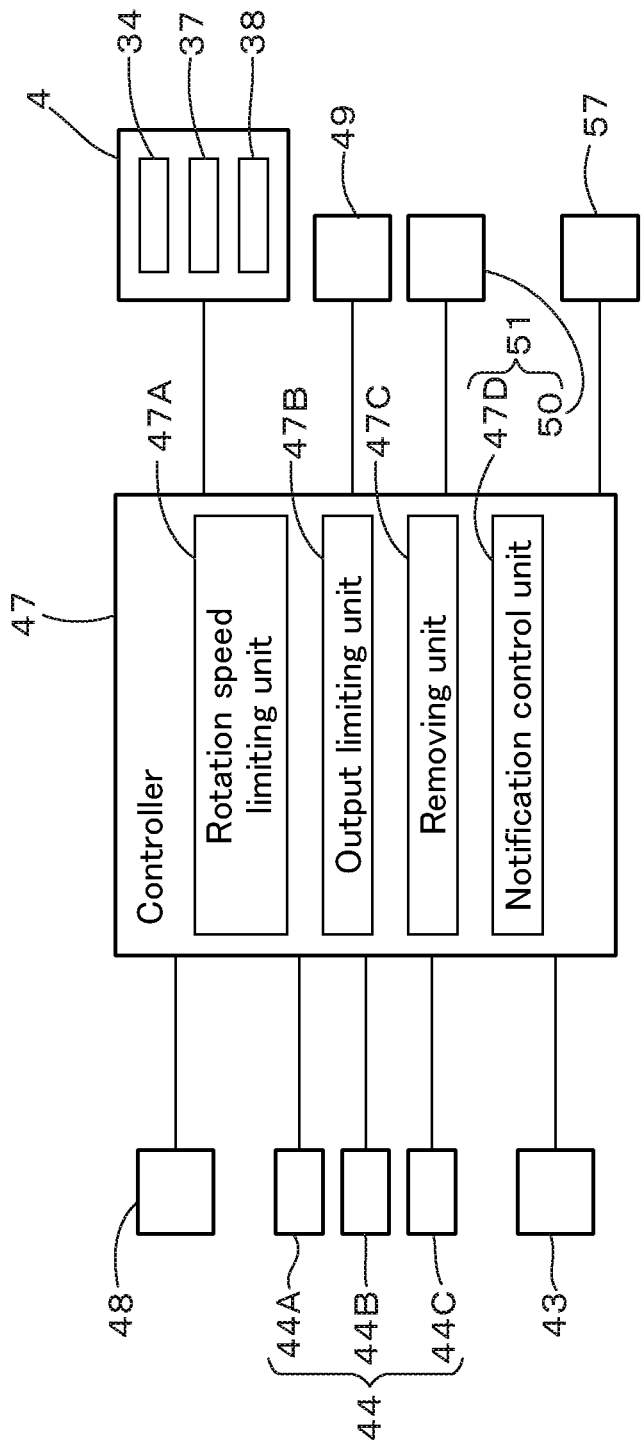
FIG. 4 is a configuration diagram of a control system.

As illustrated in FIG. 4, the working machine 1 includes a controller 47. The controller 47 may be implemented as a logic circuit (hardware) formed on, for example, an integrated circuit (IC chip) or may be implemented as software by using a computer. In the latter case, the computer includes a recording medium to which a program that is the software for implementing the functions of the controller 47 and various types of data concerning the working machine 1 are recorded so as to be readable by the computer, an arithmetic circuit, such as a CPU (central processing unit), that executes instructions of the program, and a RAM (random access memory) to which the program and various types of data are loaded. The arithmetic circuit reads the program from the recording medium and executes the program to thereby implement the functions of the controller 47.

The controller 47 is connected to the prime mover 4. The prime mover 4 is controlled by the controller 47. Specifically, the controller 47 controls, for example, the ignition coil 34, the injector 37, and the throttle valve 38 to thereby control the rotation speed and output of the prime mover 4.

To the controller 47, an accelerator dial 48 is connected. The accelerator dial 48 is an accelerator operation actuator that changes the rotation speed of the prime mover 4 from a low idle speed (for example, 1350 rpm) to a high idle speed (for example, 2600 rpm). In response to an operation of the accelerator dial 48, the controller 47 controls the rotation speed of the prime mover 4 to a rotation speed corresponding to the amount of operation of the accelerator dial 48. The accelerator dial 48 can self-hold the position of operation.

To the controller 47, the temperature detector 44 (the water temperature sensor 44A, the gas temperature sensor 44B, or the fluid temperature sensor 44C) is connected. The controller 47 can obtain detection information detected by the temperature detector 44.

When the prime mover 4 is in a cold area and cooled, the temperature of the engine cooling water is low, and therefore, the vaporization capability of the vaporizer 39 decreases. When a load is put on the prime mover 4 or the rotation speed of the prime mover 4 is increased and the amount of fuel increases while the vaporization capability is low (the engine cooling water is not heated), vaporization of, for example, LPG that is the fuel is unable to keep up with the increase and, for example, the LPG is supplied to the engine in a liquid state. Therefore, the fuel becomes excessive, the air-fuel ratio becomes too small (an excessively fuel-rich state), and the prime mover 4 stalls (an engine stall occurs). Although LPG is a blended fuel containing propane and butane as the main ingredients and has a boiling point that varies depending on the blending ratio between the ingredients, when the fuel is LPG and the temperature of the vaporizer 39 is higher than the boiling point of the LPG, the LPG is vaporized. However, as vaporization continues while the vaporization capability of the vaporizer 39 remains low, the vaporizer 39 is gradually cooled with the heat of vaporization, the LPG is unable to be sufficiently vaporized when the temperature of the vaporizer 39 decreases to the boiling point of the LPG or lower, and an engine stall occurs. In a case where an engine stall occurs due to such a cause, the prime mover 4 easily starts once and the rotation speed smoothly rises, and thereafter, an engine stall occurs. Therefore, the operator feels unusual about a sudden engine stall (the operator thinks that a trouble occurs or the gas runs out).

In the present embodiment, when the temperature detected by the temperature detector 44 during a cold start of the prime mover 4 is lower than or equal to a first temperature, the controller 47 restrains the flow rate of the fuel flowing from the vaporizer 39 to the prime mover 4. When the flow rate of the fuel flowing from the vaporizer 39 to the prime mover 4 is restrained, vaporization of the fuel can be continued and the prime mover 4 can be prevented from stalling.

As the method for restraining the flow rate of the fuel flowing from the vaporizer 39 to the prime mover 4, a method of limiting the upper limit of the rotation speed of the prime mover 4 is possible. Specifically, the controller 47 includes a rotation speed limiting unit 47A that limits the upper limit of the rotation speed of the prime mover 4. When the temperature detected by the temperature detector 44 during starting of the prime mover 4 is lower than or equal to the first temperature, the rotation speed limiting unit 47A sets the upper limit of the rotation speed of the prime mover 4 to, for example, 2000 rpm. Therefore, even when the rotation speed of the prime mover 4 is set to a rotation speed that exceeds 2000 rpm by an operation of the accelerator dial 48, the rotation speed of the prime mover 4 does not exceed 2000 rpm. When the upper limit of the rotation speed of the prime mover 4 is limited, the flow rate of the fuel flowing from the vaporizer 39 to the prime mover 4 can be restrained. Note that the rotation speed need not be limited to 2000 rpm and can be changed as appropriate.

In a case where the water temperature sensor 44A is employed as the temperature detector 44, in the above-described control for limiting the rotation speed, when the water temperature of the engine cooling water is lower than or equal to the first temperature (for example, −10° C.) during starting of the prime mover 4, the rotation speed limiting unit 47A limits the upper limit of the rotation speed of the prime mover 4. In this case, when the water temperature reaches, for example, 5° C. (second temperature), the limitation on the rotation speed is removed. That is, the controller 47 includes a removing unit 47C, and when the temperature detected by the water temperature sensor 44A (temperature detector 44) is higher than or equal to the second temperature that is higher than the first temperature, the removing unit 47C removes the limitation on the rotation speed (the restraint on the flow rate of the fuel flowing from the vaporizer 39 to the prime mover 4). When the water temperature sensor 44A provided in advance in the prime mover 4 is used as the temperature detector 44, a low-cost configuration can be implemented.

In a case where the gas temperature sensor 44B is employed as the temperature detector 44, when the temperature of the fuel (gas temperature) vaporized by the vaporizer 39 is, for example, lower than or equal to −35° C. (first temperature) during starting of the prime mover 4, the rotation speed limiting unit 47A limits the upper limit of the rotation speed of the prime mover 4. In this case, the limitation on the rotation speed is removed when the gas temperature reaches −30° C. (second temperature).

In a case where the fluid temperature sensor 44C is employed as the temperature detector 44, when the temperature (fluid temperature) of the hydraulic fluid is, for example, lower than or equal to −10° C. (first temperature) during starting of the prime mover 4, the rotation speed limiting unit 47A limits the upper limit of the rotation speed of the prime mover 4. In this case, the limitation on the rotation speed is removed when the fluid temperature reaches 5° C. (second temperature).

The first temperature and the second temperature need not be set to the above-described numerical values and may be changed as appropriate in accordance with, for example, the composition of the fuel or the characteristics of the vaporizer 39.

After the elapse of a certain time since starting of the prime mover 4, it is expected that the water temperature of the engine cooling water (the temperature of the prime mover 4) rises, and therefore, the removing unit 47C may remove the limitation on the rotation speed (the restraint on the flow rate of the fuel) after the elapse of a predetermined time since starting of the prime mover 4. This predetermined time is, for example, 120 seconds. That is, the removing unit 47C removes the limitation on the rotation speed after the elapse of 120 seconds since starting of the prime mover 4. The predetermined time need not be 120 seconds. The time from when the prime mover 4 is started to when the limitation on the rotation speed is removed need not be a fixed time. That is, the time from when the prime mover 4 is started to when the limitation on the rotation speed is removed may be changed in accordance with the temperature (water temperature, gas temperature, or fluid temperature) detected by the temperature detector 44 during starting of the prime mover 4.

As the method for restraining the flow rate of the fuel flowing from the vaporizer 39 to the prime mover 4, a method of limiting the output of the prime mover 4 (the opening of the throttle valve 38) is possible. Specifically, the controller 47 includes an output limiting unit 47B that limits the output of the prime mover 4. When the temperature detected by the temperature detector 44 during starting of the prime mover 4 is a low temperature lower than or equal to the first temperature, the output limiting unit 47B sets the upper limit of the opening of the throttle valve 38 to, for example, 20% to thereby limit the output of the prime mover 4. When the ratio between the intake air and the fuel is substantially constant and a limitation is imposed on the throttle valve 38, the amount of fuel is limited. Accordingly, the flow rate of the fuel flowing from the vaporizer 39 to the prime mover 4 can be restrained.

Also in this case, the temperature detector 44 may be any of the water temperature sensor 44A, the gas temperature sensor 44B, or the fluid temperature sensor 44C. The limitation on the output is similarly removed as described above.

As illustrated in FIG. 4, to the controller 47, a display unit 49 indicating that the flow rate of the fuel flowing to the prime mover 4 is restrained is connected. When the upper limit of the rotation speed of the prime mover 4 is limited or when the output of the prime mover 4 is limited, the controller 47 indicates on the display unit 49 that the limitation is imposed. The display unit 49 is provided at a position near the operator's seat 8 such that the operator can see. The display unit 49 is, for example, an indicator including a lamp. The display unit 49 may be an indicator that is displayed on a display provided near the operator's seat 8. The indication by the display unit 49 is canceled when the limitation on the upper limit of the rotation speed or the limitation on the output is removed.

The prime mover 4 need not be an electronically controlled engine and may be a motor using, for example, LPG as fuel.

As illustrated in FIG. 4, to the controller 47, the remaining amount sensor 43 is connected. The controller 47 can obtain detection information detected by the remaining amount sensor 43. To the controller 47, a notification device 50 is connected. The controller 47 includes a notification control unit 47D that controls the notification device 50. The notification control unit 47D can obtain detection information detected by the remaining amount sensor 43. The notification device 50 and the notification control unit 47D constitute a notification unit 51 that gives a notification about a decreasing change in the remaining fuel in a predetermined notification form after the remaining amount sensor 43 has detected the amount of remaining fuel in the reserve tank 42 reaching the predetermined amount.

The notification device 50 is, for example, a sound emitting device, such as a beeper, that periodically makes a beep sound (warning sound), such as beeps. Therefore, the notification form in this case is a form in which a warning sound is made. The notification device 50 emits a warning sound on the basis of a command signal (clock signal) 52, illustrated in FIG. 5, output from the notification control unit 47D.

Figure 5:
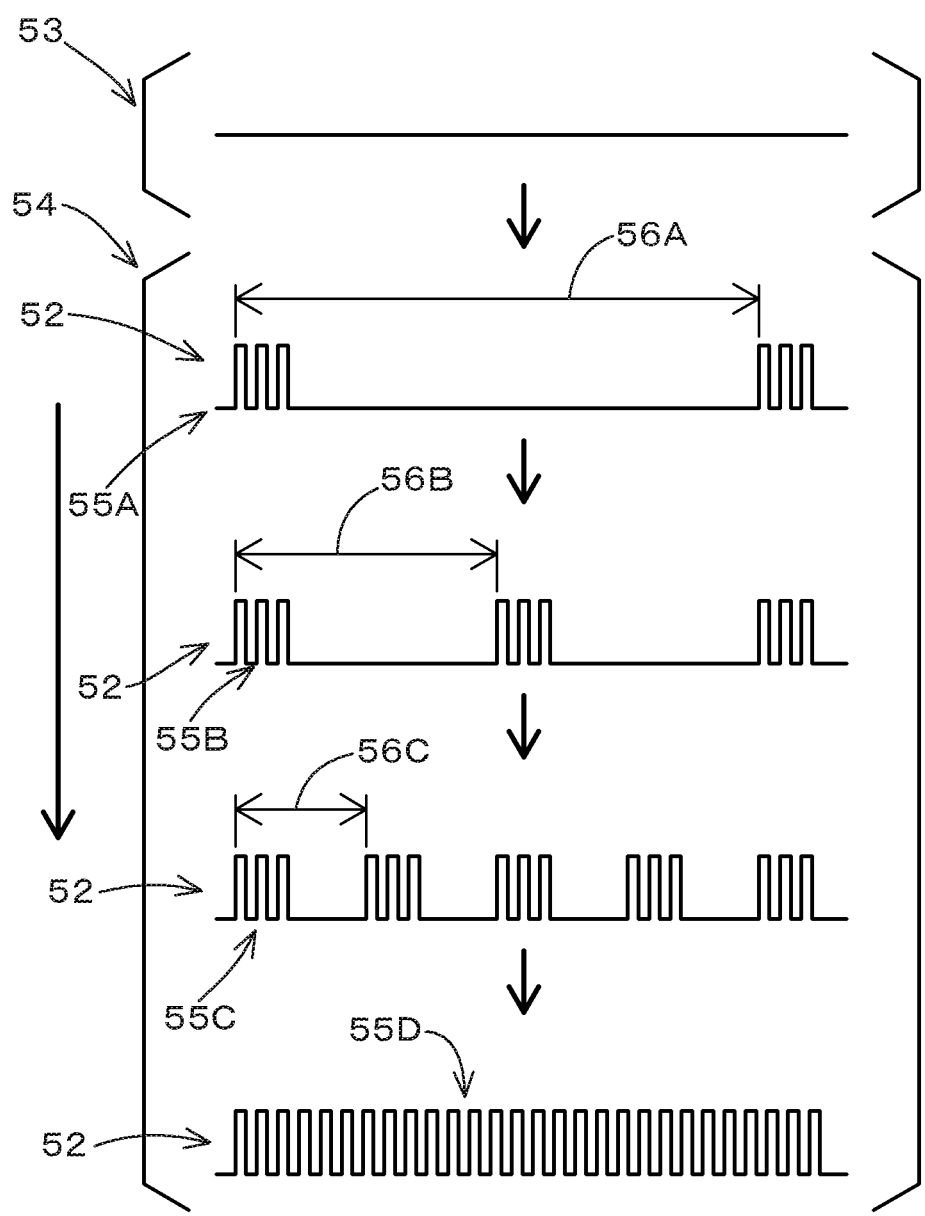
FIG. 5 is a diagram illustrating a clock signal for a warning sound.

The notification unit 51 (notification control unit 47D) changes the notification form step by step in accordance with a decrease in the amount of remaining fuel. That is, as illustrated in FIG. 5, in a non-detection state 53 in which the remaining amount sensor 43 does not detect the amount of remaining fuel in the reserve tank 42 reaching the predetermined amount, the notification unit 51 (notification device 50) does not emit a warning sound. In a detection state 54 in which the remaining amount sensor 43 detects the amount of remaining fuel in the reserve tank 42 reaching the predetermined amount, the notification unit 51 (notification device 50) emits a warning sound. In the present embodiment, the notification form (warning sound) is changed in four stages 55A to 55D. A first stage 55A corresponds to a state in which switching from the non-detection state 53 to the detection state 54 occurs. In the first stage 55A, the warning sound is repeated at predetermined intervals 56A (for example, at intervals of one minute). In a second stage 55B, the warning sound is repeated at intervals 56B (for example, at intervals of ten seconds) shorter than in the first stage 55A. In a third stage 55C, the warning sound is repeated at intervals 56C (for example, at intervals of five seconds) shorter than in the second stage 55B. In a fourth stage 55D, the warning sound is successively emitted.

As illustrated in FIG. 4, to the controller 47, a refueling lamp 57 indicating that the remaining amount sensor 43 has performed the detection is connected. The refueling lamp 57 is provided near the operator's seat 8. The refueling lamp 57 is not lit in the non-detection state 53, blinks in the first stage 55A to the third stage 55C (in the initial stage to the stage preceding the last stage), and is lit in the fourth stage 55D (the last stage). The blinking interval of the refueling lamp 57 may be made different among the first stage 55A to the third stage 55C. In this case, the blinking interval may correspond to the intervals at which the warning sound is repeated.

The notification control unit 47D changes the notification form in accordance with the driving time of the prime mover 4 (the elapsed time during which the prime mover 4 is driving (revolving)) after the remaining amount sensor 43 has performed the detection. Specifically, the notification control unit 47D starts counting the time from when the remaining amount sensor 43 performed the detection, on condition that the prime mover 4 is revolving, and changes the intervals at which the warning sound is repeated, in accordance with the elapsed time (for example, for every several minutes) from the first stage 55A to the fourth stage 55D.

When the prime mover 4 stops during a transition from the first stage 55A to the fourth stage 55D, upon the stop, the notification control unit 47D may stop counting the time and stores the count on the controller 47. The notification control unit 47D may resume counting when the prime mover 4 is restarted without replacement of the fuel cylinder 130. When the fuel cylinder 130 is replaced, that is, when the remaining amount sensor 43 is in the non-detection state 53, the notification control unit 47D clears the count The notification control unit 47D may calculate the fuel consumption after the remaining amount sensor 43 has performed the detection and change the notification form on the basis of the calculated fuel consumption. The fuel consumption is calculated, for example, by using the following characteristics on the basis of one or more calculation conditions among "the amount of air mixed with fuel", "the rotation speed of the prime mover 4", "the opening of the throttle valve 38", and "the operating time of the prime mover 4".

Figure 6:
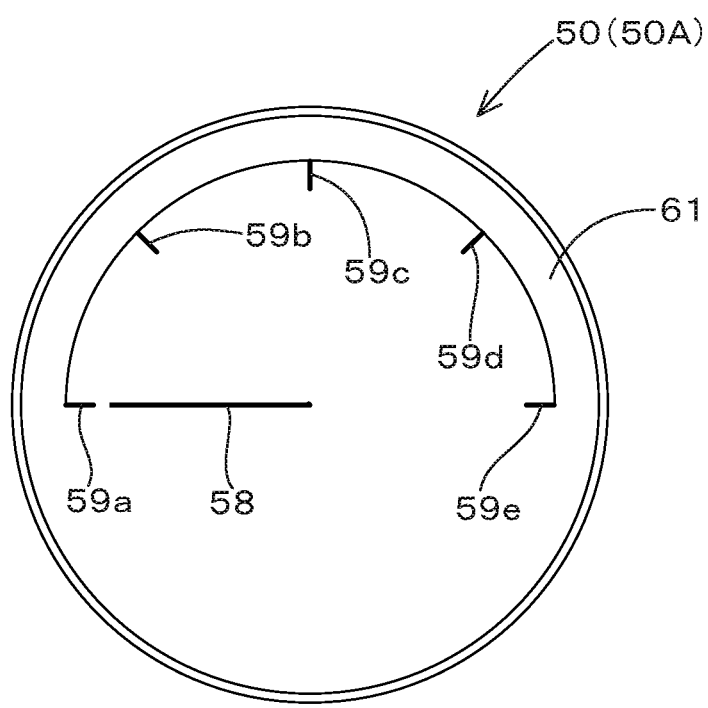
FIG. 6 is a diagram of a notification device that is a meter.

Characteristics
   Operating time of prime mover 4: long→Fuel consumption: high
   Opening of throttle valve 38: large→Fuel consumption: high
   Rotation speed of prime mover 4: high→Fuel consumption: high
   Flow rate of air flowing to cylinder 32: high→Fuel consumption: high
   Air-fuel ratio: high→Fuel consumption: low
   Output of prime mover 4: high→Fuel consumption: high As illustrated in FIG. 6, the notification device 50 may be a meter (pointer meter) 50A including a pointer 58. The meter 50A is provided at a position near the operator's seat 8 such that the operator can see. The meter 50A includes an indication surface 61 that includes a plurality of (five) scale lines (a first scale line 59a to a fifth scale line 59e). While the remaining amount sensor 43 is in the non-detection state, the pointer 58 points the first scale line 59a. When the remaining amount sensor 43 transitions to the detection state, the pointer 58 points a second scale line 59b (the first stage). Thereafter, the pointer 58 points a third scale line 59c (the second stage), a fourth scale line 59d (the third stage), and the fifth scale line 59e (the fourth stage or the last stage) step by step. Therefore, in a case where the notification device 50 is the meter 50A, the notification form is a form in which the pointer 58 points the second scale line 59b to the fifth scale line 59e. Also in this case, the notification form changes step by step in four stages.

Although the notification form is changed in four stages in the present embodiment, the number of stages need not be four. That is, the number of stages in which the notification form is changed may be five or more or may be two or three. In the case where the notification device 50 is the meter 50A, the notification form need not be changed step by step and may be continuously changed.

For the working machine 1 for which the fuel cylinder 130 is replaced at the time of fuel replenishment, the filling amount of the fuel cylinder 130 differs depending on the cylinder size, and therefore, it is difficult to estimate the amount of remaining fuel on the basis of the operating time from immediately after replacement.

For the working machine 1 including the reserve tank 42 from which a fuel is supplied to the prime mover 4 when the amount of remaining fuel in the fuel cylinder 130 decreases to the predetermined amount or less, a warning of the decreasing fuel can be issued in response to detection of the amount of remaining fuel in the reserve tank 42 reaching the predetermined amount. However, the fuel still remains in the fuel cylinder 130, and therefore, replacement at this time results in the remaining fuel going to waste. Further, even when the fuel supply source is switched to the reserve tank 42, the fuel remaining in the fuel cylinder 130 is supplied to the reserve tank 42. Therefore, the working machine 1 can be operated even after detection of the amount of remaining fuel in the reserve tank 42 reaching the predetermined amount. Further, replacing the fuel cylinder 130 while the amount of remaining fuel is large is wasteful, and therefore, there is a demand for using up the fuel to the extent possible. In other words, there is a demand for grasping how long the working machine 1 can work (or has worked) after the amount of remaining fuel decreases (after detection of the fuel in the reserve tank 42 reaching the predetermined amount).

In the present embodiment, after the remaining amount sensor 43 has performed the detection, the notification form in which a notification about the amount of remaining fuel is given is changed step by step or continuously in accordance with a decrease in the amount of remaining fuel, and therefore, the operator can grasp the amount of remaining fuel after detection of the fuel in the reserve tank 42 reaching the predetermined amount. That is, when the notification form changes step by step or continuously, the operator can check changes in the amount of remaining fuel and can grasp the timing when the fuel cylinder 130 is to be replaced. Accordingly, the fuel can be used up to the extent possible, and the fuel cylinder 130 can be replaced before the prime mover 4 stalls. The notification form thus changed is helpful in determining the timing of, for example, the end of the current operation or movement to a place for replacement. The operator can recognize the necessity of replacement of the fuel cylinder 130 and is encouraged to replace the fuel cylinder 130, and therefore, the prime mover 4 can be prevented from stalling.

Now, a system configuration that allows the operator to grasp the amount of remaining fuel that changes from a full-of-fuel state will be described with reference to FIG. 7 to FIG. 9.

Figure 7:
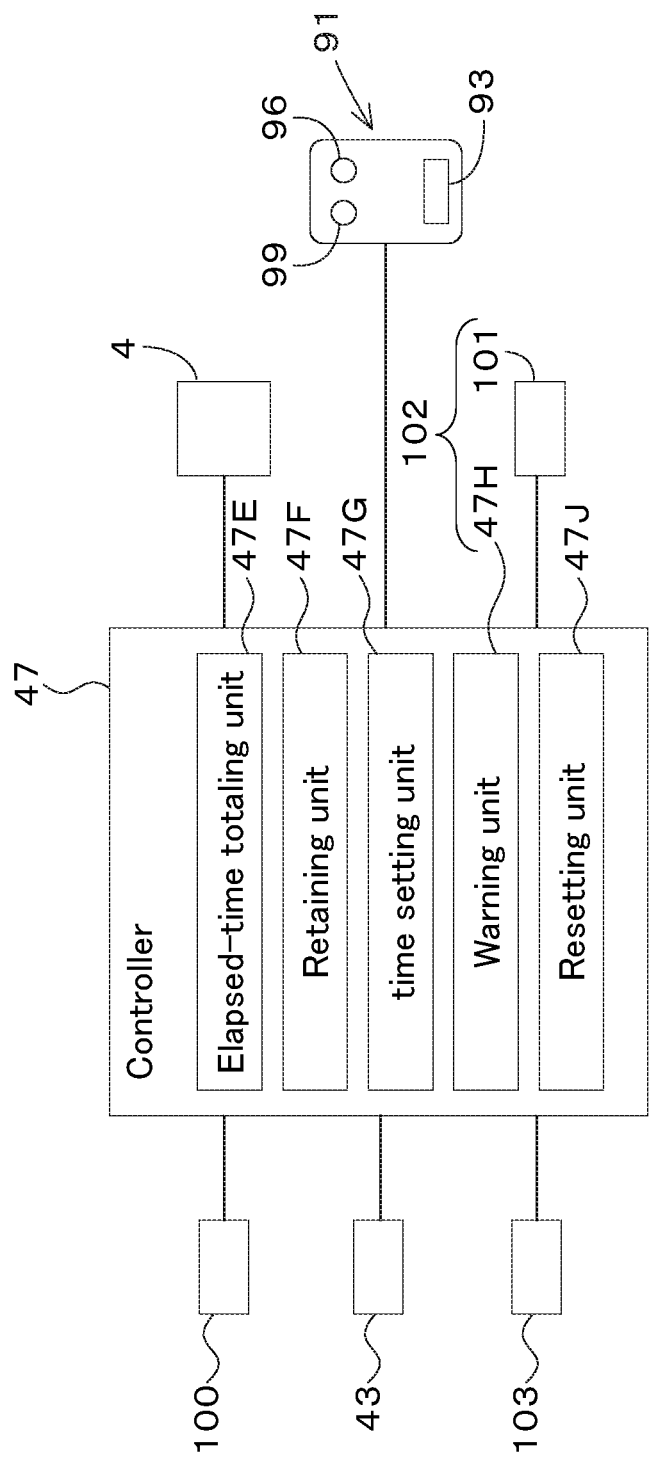
FIG. 7 is a configuration diagram of a control system.

As illustrated in FIG. 7, the controller 47 includes an elapsed-time totaling unit 47E that totals the elapsed time (the driving time of the prime mover 4), during which the prime mover 4 is driving, after replacement of the fuel cylinder 130, a retaining unit 47F that retains in response to a stop of the prime mover 4, the elapsed time totaled by the elapsed-time totaling unit 47E until the stop, a time setting unit 47G that allows the operator to set a time, a warning unit 47H that sends a signal to a warner 101 described below in response to the elapsed time totaled by the elapsed-time totaling unit 47E reaching a time set by the time setting unit 47G, and a resetting unit 47J that resets the elapsed time totaled by the elapsed-time totaling unit 47E and the elapsed time displayed in a screen display part 93.

To the controller 47, the prime mover 4 is connected, and therefore, the controller 47 can obtain information about whether the prime mover 4 is driving and the rotation speed of the prime mover 4.

As illustrated in FIG. 7, to the controller 47, a display 91 is connected. The controller 47 and the display 91 can communicate with each other. That is, the controller 47 can obtain a signal from the display 91, and the display 91 can obtain a signal from the controller 47. The display 91 is, for example, a meter that can display, for example, the vehicle speed of the working machine 1, the rotation speed of the prime mover 4, and the water temperature of the cooling water for the prime mover 4. The display 91 is provided at a position near the operator's seat 8 such that the operator can see.

Figure 8:
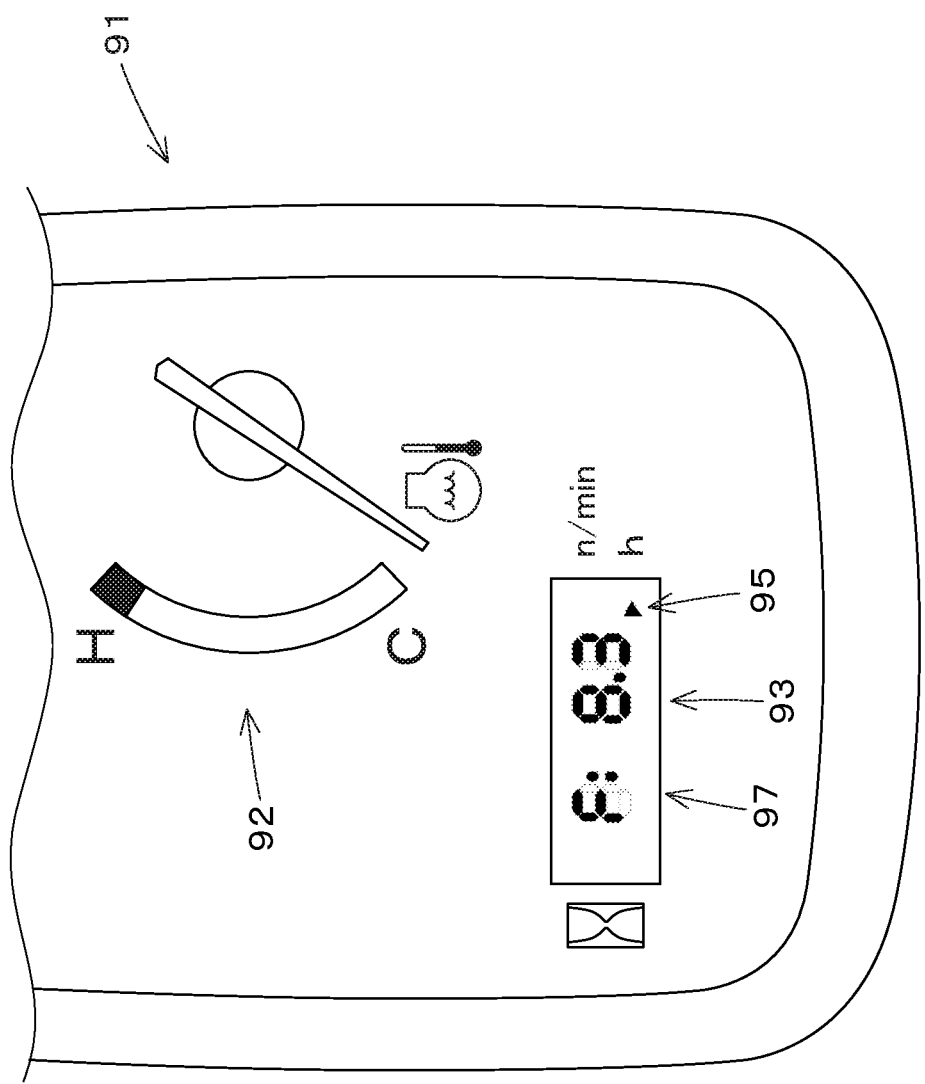
FIG. 8 is a front view of a display.

As illustrated in FIG. 8, the display 91 includes a temperature display part 92 and the screen display part 93 in the lower part thereof. The temperature display part 92 displays the water temperature of the cooling water for the prime mover 4. In the screen display part 93, characters and numerical values can be displayed by seven-segment representation. In the screen display part 93, the elapsed time totaled by the elapsed-time totaling unit 47E can be displayed. When the elapsed time after replacement of the fuel cylinder 130 is displayed in the screen display part 93, the operator can be notified of the elapsed time (the driving time of the prime mover 4) after replacement of the fuel cylinder 130. In the present embodiment, the time to be counted by the elapsed-time totaling unit 47E is counted up from zero and displayed in the screen display part 93.

As illustrated in FIG. 8, the elapsed time totaled by the elapsed-time totaling unit 47E and displayed in the screen display part 93 is displayed in units of hours and is counted up by 0.1 hours. In the screen display part 93, a pointer 95 pointing h, which indicates the unit of the time, can be displayed.

An upper limit is set for display of the elapsed time to be displayed in the screen display part 93. The upper limit is set to, for example, 20 hours.

As illustrated in FIG. 7, a reset switch 96 operated (manually) by the operator is provided on the display 91. In response to the operator operating the reset switch 96, the elapsed time totaled by the elapsed-time totaling unit 47E and the elapsed time displayed in the screen display part 93 are reset (to zero) by the resetting unit 47J. The resetting unit 47J performs the above-described resetting in response to a predetermined operation being performed on the reset switch 96. In the present embodiment, in response to pressing and holding down of the reset switch 96 (for example, pressing for 2 seconds or more), the elapsed time totaled by the elapsed-time totaling unit 47E and the elapsed time displayed in the screen display part 93 are reset. Accordingly, the elapsed time can be restrained (prevented) from being reset by an accidental operation.

Note that the reset switch 96 may be provided at a position other than the display 91. The elapsed time displayed in the screen display part 93 may be reset by an output signal from the controller 47. The elapsed-time totaling unit 47E may be provided in the display 91.

As described above, in response to the operator pressing the reset switch 96 after replacement of the fuel cylinder 130, the elapsed time previously totaled by the elapsed-time totaling unit 47E and the elapsed time displayed in the screen display part 93 are reset, and the elapsed time, during which the prime mover 4 is driving, after replacement of the fuel cylinder 130 (after resetting) is displayed in the screen display part 93. Therefore, when the operator presses the reset switch 96 after replacement of the fuel cylinder 130 and before starting of the prime mover 4, the operator can know the elapsed time, during which the prime mover 4 is driving, immediately after the replacement of the fuel cylinder 130 (in a full-of-fuel state). That is, even for the working machine 1 for which the fuel cylinder 130 that is of a replaceable type not including a sensor, such as a float, capable of detecting changes in the amount of remaining fuel is used, the operator can know the estimated amount of remaining fuel in the fuel cylinder 130 from the elapsed time since replacement of the fuel cylinder 130. For the working machine 1 of the present embodiment, the operator can grasp how much the fuel has been used until the remaining amount sensor 43 detects the amount of remaining fuel in the reserve tank 42 reaching the predetermined amount.

Even when the size (capacity) of the fuel cylinder 130 differs from operator to operator, the amount of remaining fuel in the fuel cylinder 130 that is currently used can be grasped by comparing with the use time of the fuel cylinder 130 previously used by each operator.

As illustrated in FIG. 9, the screen display part 93 can switch display between a time display screen 97 that displays the elapsed time totaled by the elapsed-time totaling unit 47E and at least another display screen 98 other than the time display screen 97. The elapsed time can be reset by the reset switch 96 when not the other display screen 98 but the time display screen 97 is displayed. Accordingly, an accidental operation for resetting the elapsed time can be restrained.

The other display screen 98 includes an hour meter display screen 98A that displays the accumulated hours of operation of the working machine 1, a watch display screen 98B that displays the current time, a tachometer display screen 98C that displays the rotation speed of the prime mover 4, an AUX mode display screen 98D that is displayed in an AUX mode in which another working tool fitted instead of or in addition to the bucket 27 is used, and a warning display screen 98E that is displayed while a warning is being issued.

As illustrated in FIG. 7, the display 91 includes a switching switch 99. Each time the switching switch 99 is pressed, display switches in the order of the hour meter display screen 98A, the time display screen 97, the watch display screen 98B, the tachometer display screen 98C, the AUX mode display screen 98D, and the warning display screen 98E, and subsequent to the warning display screen 98E, returns to the hour meter display screen 98A. The AUX mode display screen 98D includes a plurality of screens, and the screen switches every second. On the warning display screen 98E, a warning number scrolls every second. The AUX mode display screen 98D is displayed in the AUX mode, and the warning display screen 98E is displayed while a warning is being issued.

The elapsed time to be totaled by the elapsed-time totaling unit 47E is totaled while the rotation speed of the prime mover 4 is higher than or equal to a predetermined rotation speed. The predetermined rotation speed is, for example, 700 that is lower than an idling speed. The accumulated hours of operation of the working machine 1 are similarly counted while the rotation speed of the prime mover 4 is higher than or equal to 700. On the time display screen 97 and on the hour meter display screen 98A, the pointer 95 blinks while the rotation speed of the prime mover 4 is higher than or equal to 700.

The elapsed-time totaling unit 47E stops totaling the elapsed time when the prime mover 4 stops (is keyed off) and resumes totaling of the elapsed time when driving of the prime mover 4 is resumed (the prime mover 4 is keyed on) with a retained elapsed time that is the elapsed time retained by the retaining unit 47F.

As illustrated in FIG. 7, to the controller 47, a time setter 100 is connected. The controller 47 can obtain an operation signal from the time setter 100. The time setter 100 is operated by the operator and outputs an operation signal to the controller 47. Specifically, the time setter 100 includes an operation member that is operated by the operator and a screen unit that displays a time set by using the operation member, and the time set by using the operation member is output to the controller 47. On the basis of the operation signal from the time setter 100, the time is set in the time setting unit 47G. The time setter 100 may be provided in the display 91.

As illustrated in FIG. 7, to the controller 47, the warner 101 is connected. The warner 101 issues a warning in accordance with a signal from the warning unit 47H. Specifically, in response to the elapsed time totaled by the elapsed-time totaling unit 47E reaching the time set in the time setting unit 47G, the warning unit 47H sends a command signal to the warner 101. Then, the warner 101 issues a warning of the elapsed time reaching the time set by the time setting unit 47G, to the operator in a predetermined warning form. The warning unit 47H issues a command signal regardless of the output upon the remaining amount sensor 43 detecting the amount of remaining fuel in the reserve tank 42 reaching the predetermined amount. The predetermined warning form can be, for example, a warning sound from a beeper, a warning by voice, or lighting or blinking of a lamp. Other warning forms may be employed. The predetermined warning form may be a combination of a plurality of forms.

The warning unit 47H and the warner 101 constitute a warning device 102 that issues a warning in the predetermined warning form in response to the elapsed time totaled by the elapsed-time totaling unit 47E reaching the time set by the time setting unit 47G.

For the present embodiment, various changes can be made. Although the elapsed time totaled by the elapsed-time totaling unit 47E and the elapsed time displayed in the screen display part 93 are reset by the operator manually operating the reset switch 96 in the above-described embodiment, the elapsed time may be automatically reset. For example, the resetting unit 47J can reset the elapsed time in response to the remaining amount sensor 43 detecting the amount of remaining fuel in the reserve tank 42 being larger than or equal to the predetermined amount after replacement of the fuel cylinder 130. Specifically, when the output of the remaining amount sensor 43 changes from ON (the remaining fuel runs low) to OFF (there is a remaining amount of fuel), the resetting unit 47J automatically clears the elapsed time totaled by the elapsed-time totaling unit 47E and the elapsed time displayed in the time display screen 97 (to zero). In this case, the remaining amount sensor 43 functions as a reset switch. Alternatively, a replacement detector (not illustrated) that is, for example, any type of switch or sensor detecting the fuel cylinder 130 having been replaced may be provided, and the resetting unit 47J may reset the elapsed time when replacement of the fuel cylinder 130 is detected. The above-described replacement detector may be, for example, a detector that detects the fitting state of the fuel cylinder 130 or may be a detector that detects, for example, the position, attitude, or operation of a detaching mechanism or a support mechanism of the fuel cylinder 130.

For example, as illustrated in FIG. 7, to the controller 47, a cylinder detection sensor 103 that detects the fuel cylinder 130 can be connected, and the resetting unit 47J can reset the elapsed time totaled by the elapsed-time totaling unit 47E and the elapsed time displayed in the screen display part 93 in accordance with a signal from the cylinder detection sensor 103. The cylinder detection sensor 103 is a contact sensor or a noncontact sensor that is provided in a part to which the fuel cylinder 130 is fitted and that detects whether the fuel cylinder 130 is fitted. In response to detection of the used fuel cylinder 130 being removed and the replacement fuel cylinder 130 being subsequently fitted, the cylinder detection sensor 103 outputs a signal to the resetting unit 47J. In this case, the cylinder detection sensor 103 functions as a reset switch.

In a case where the elapsed time is automatically reset, the reset switch 96 is not necessary.

Although display using a seven-segment meter is employed as the display form for showing the operator the elapsed time totaled by the elapsed-time totaling unit 47E in the present embodiment, display using a meter (pointer meter) including a pointer may be employed. Specifically, the display may be a pointer meter including a pointer and scales provided at intervals of 0.1 hours from zero, and the pointer may be configured to move from zero in a direction in which the time increases, in accordance with the elapsed time totaled by the elapsed-time totaling unit 47E.

Although a count-up method in which the elapsed time to be totaled by the elapsed-time totaling unit 47E is counted up from zero and displayed in the screen display part 93 (time display screen 97) is employed in the present embodiment, the count-up method need not be employed. A count-down method in which the elapsed time is counted down from a preset time as time passes and displayed in the screen display part 93 may be employed. In this count-down method, for example, an initial value is determined on the basis of past data of the time from fitting of the fuel cylinder 130 that is in a full-of-fuel state to replacement, and the elapsed time is decremented from the initial value by a predetermined value (for example, 0.1 hours) as time passes and displayed in the screen display part 93. For the count-down method, an initial value determiner that determines the initial value for the fuel cylinder 130 on a capacity basis is provided. In a case where the fuel cylinder 130 having the same capacity is used every time, the previously determined initial value is used.

The working machine 1 described above includes: the machine body 2; the prime mover 4 that is mounted on the machine body 2; the fuel cylinder 130 that contains a fuel; the vaporizer 39 that vaporizes the fuel sent from the fuel cylinder 130 and supplies the fuel to the prime mover 4; the temperature detector 44 that detects a temperature correlating with a decrease in the temperature of the vaporizer 39; and the controller 47 that imposes restraint on the flow rate of the fuel flowing from the vaporizer 39 to the prime mover 4 when the temperature detected by the temperature detector 44 is lower than or equal to a first temperature.

With the above-described configuration, the flow rate of the fuel flowing from the vaporizer 39 to the prime mover 4 is restrained when the temperature detected by the temperature detector 44 during a cold start of the prime mover 4 is a low temperature lower than or equal to the first temperature, and therefore, it is possible to continue vaporization of the fuel and to prevent the prime mover 4 from stalling.

Further, the working machine 1 includes the display unit 49 that indicates that the flow rate of the fuel flowing to the prime mover 4 is restrained.

With the above-described configuration, it is possible to allow the operator to recognize that the flow rate of the fuel is restrained.

Further, the controller 47 includes the rotation speed limiting unit 47A that limits the upper limit of the rotation speed of the prime mover 4 so as to restrain the flow rate of the fuel flowing to the prime mover 4.

With the above-described configuration, it is possible to restrain the flow rate of the fuel flowing from the vaporizer 39 to the prime mover 4 and to prevent the prime mover 4 from stalling by limiting the upper limit of the rotation speed of the prime mover 4.

Further, the controller 47 includes the output limiting unit 47B that limits the output of the prime mover 4 so as to restrain the flow rate of the fuel flowing to the prime mover 4.

With the above-described configuration, it is possible to restrain the flow rate of the fuel flowing from the vaporizer 39 to the prime mover 4 and to prevent the prime mover 4 from stalling by limiting the output of the prime mover 4.

Further, the controller 47 includes the removing unit 47C that removes the restraint when the temperature detected by the temperature detector 44 is higher than or equal to a second temperature that is higher than the first temperature.

With the above-described configuration, it is possible to automatically remove the restraint on the flow rate of the fuel flowing to the prime mover 4.

Further, the controller 47 includes the removing unit 47C that removes the restraint after the elapse of a predetermined time since starting of the prime mover 4.

With the above-described configuration, it is possible to automatically remove the restraint on the flow rate of the fuel flowing to the prime mover 4.

Further, the temperature detector 44 is the water temperature sensor 44A that detects the temperature of cooling water for the prime mover 4.

With the above-described configuration, it is possible to appropriately determine whether the fuel can be satisfactorily vaporized, by detecting the temperature of the cooling water for the prime mover 4.

Further, the temperature detector 44 is the gas temperature sensor 44B that detects the temperature of the fuel vaporized by the vaporizer 39.

With the above-described configuration, it is possible to appropriately determine whether the fuel can be satisfactorily vaporized, by detecting the temperature of the fuel vaporized by the vaporizer 39.

Further, the working machine 1 includes a hydraulic device that is driven by using a hydraulic fluid, in which the temperature detector 44 is the fluid temperature sensor 44C that detects the temperature of the hydraulic fluid.

With the above-described configuration, it is possible to appropriately determine whether the fuel can be satisfactorily vaporized, by detecting the temperature of the hydraulic fluid.

Further, the working machine 1 described above includes: the machine body 2; the prime mover 4 that is mounted on the machine body 2; the fuel cylinder 130 that contains a fuel to be supplied to the prime mover 4; the reserve tank 42 that stores the fuel supplied from the fuel cylinder 130 and supplies the fuel to the prime mover 4 when the amount of remaining fuel in the fuel cylinder 130 decreases to a predetermined amount or less; the remaining amount sensor 43 that detects a state in which the amount of remaining fuel in the reserve tank 42 reaches a predetermined amount; and the notification unit 51 that gives a notification about a decreasing change in a remaining fuel in a predetermined notification form after the remaining amount sensor 43 has detected the state.

With the above-described configuration, it is possible to grasp the amount of remaining fuel after detection of the fuel in the reserve tank 42 reaching the predetermined amount, with the notification given by the notification unit 51.

Further, the notification unit 51 includes the notification control unit 47D that changes the notification form in accordance with the driving time of the prime mover 4 after the remaining amount sensor 43 has detected the state.

With the above-described configuration, it is possible to change the notification form by counting the driving time of the prime mover 4 after the remaining amount sensor 43 has detected the state.

Further, the notification unit 51 includes the notification control unit 47D that calculates a fuel consumption after the remaining amount sensor 43 has detected the state and that changes the notification form on the basis of the calculated fuel consumption.

With the above-described configuration, it is possible to change the notification form by calculating the fuel consumption after the remaining amount sensor 43 has detected the state.

The notification control unit 47D may change the notification form step by step.

Further, the notification unit 51 includes the notification device 50 that emits a warning sound, the notification form is a form in which the warning sound is periodically made, and the notification control unit 47D changes the notification form by sending to the notification device 50, the command signal 52 for narrowing intervals at which the warning sound is made, in accordance with a decreasing change in the remaining fuel.

With the above-described configuration, it is possible to allow the operator to recognize by sound, the amount of remaining fuel after detection of the fuel in the reserve tank 42 reaching the predetermined amount.

Further, the notification control unit 47D calculates the fuel consumption on the basis of one or more calculation conditions among the amount of air mixed with the fuel, the rotation speed of the prime mover 4, the opening of the throttle valve 38, and the operating time of the prime mover 4.

With the above-described configuration, it is possible to calculate the fuel consumption after the remaining amount sensor 43 has detected the state.

Further, the working machine 1 includes the refueling lamp 57 that indicates that the remaining amount sensor 43 has detected the state, in which the notification control unit 47D makes the refueling lamp 57 blink in the initial stage (the first stage 55A) to the stage (the third stage 55C) preceding the last stage in the notification form and lights the refueling lamp 57 in the last stage (the fourth stage 55D) in the notification form.

With the above-described configuration, it is possible to allow the operator to recognize by the refueling lamp 57, the amount of remaining fuel after detection of the fuel in the reserve tank 42 reaching the predetermined amount.

Further, the working machine 1 described above includes: the machine body 2; the prime mover 4 that is mounted on the machine body 2; the fuel cylinder 130 of a replaceable type that contains a fuel to be supplied to the prime mover 4; the elapsed-time totaling unit 47E that totals the driving time of the prime mover 4 after replacement of the fuel cylinder 130; and the display 91 that is capable of displaying the driving time totaled by the elapsed-time totaling unit 47E.

With the above-described configuration, it is possible to allow the operator to grasp changes in the amount of remaining fuel after replacement of the fuel cylinder 130, by displaying the driving time of the prime mover 4 after replacement of the fuel cylinder 130 on the display 91. Accordingly, it is possible to estimate the amount of remaining fuel in the fuel cylinder 130.

Further, the working machine 1 includes the resetting unit 47J that resets the driving time totaled by the elapsed-time totaling unit 47E and display of the driving time.

The driving time totaled by the elapsed-time totaling unit 47E and display of the driving time are reset by the resetting unit 47J when the fuel cylinder 130 is in a full-of-fuel state, and therefore, it is possible to grasp the amount of remaining fuel decreasing from when the fuel cylinder 130 is in the full-of-fuel state.

Further, the working machine 1 includes the reset switch 96 that is operated by an operator, in which the resetting unit 47J resets the driving time and display of the driving time in response to a predetermined operation being performed on the reset switch 96.

With the above-described configuration, it is possible to reset the driving time in accordance with the operator's intention.

Further, the display 91 includes the screen display part 93, the screen display part 93 is capable of switching display between the time display screen 97 that displays the driving time and at least another display screen 98 other than the time display screen 97, and the driving time and display of the driving time are reset by the operator when not the other display screen 98 but the time display screen 97 is displayed.

With the above-described configuration, it is possible to restrain an accidental operation for resetting the elapsed time.

Further, the elapsed-time totaling unit 47E totals the driving time while the rotation speed of the prime mover 4 is higher than or equal to a predetermined rotation speed.

With the above-described configuration, it is possible to prevent the elapsed-time totaling unit 47E from counting hours other than the actual hours of operation of the working machine 1.

Further, the working machine 1 includes the retaining unit 47F that retains, in response to a stop of the prime mover 4, the driving time totaled until the stop, in which the elapsed-time totaling unit 47E stops totaling the driving time in response to a stop of the prime mover 4, and resumes totaling of the driving time in response to resumption of driving of the prime mover 4, with the driving time retained by the retaining unit 47F.

With the above-described configuration, it is possible to accurately grasp changes in the amount of remaining fuel.

Further, the working machine 1 includes: the reserve tank 42 that stores the fuel supplied from the fuel cylinder 130 and supplies the fuel to the prime mover 4 when the amount of remaining fuel in the fuel cylinder 130 decreases to a predetermined amount or less; and the remaining amount sensor 43 that detects the amount of remaining fuel in the reserve tank 42 reaching a predetermined amount, in which the resetting unit 47J resets the driving time and display of the driving time in response to the remaining amount sensor 43 detecting the amount of remaining fuel in the reserve tank 42 being larger than or equal to the predetermined amount after replacement of the fuel cylinder 130.

With the above-described configuration, it is possible to automatically reset the elapsed time.

Further, the working machine 1 includes: the time setting unit 47G that allows the operator to set a time; and the warning device 102 that issues a warning in a predetermined warning form in response to the driving time totaled by the elapsed-time totaling unit 47E reaching the time set by the time setting unit 47G.

With the above-described configuration, it is possible to allow the operator to set the timing at which a reminder is to be issued in response to a decrease in the amount of remaining fuel.

Further, the working machine 1 includes a replacement detector that detects replacement of the fuel cylinder 130, in which the resetting unit 47J resets the driving time and display of the driving time in response to detection of replacement of the fuel cylinder 130.

With the above-described configuration, it is possible to automatically reset the elapsed time.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
   a machine body;
   a prime mover that is mounted on the machine body;
   a fuel cylinder that contains a fuel;
   a vaporizer that vaporizes the fuel sent from the fuel cylinder and supplies the fuel to the prime mover;
   a temperature detector that detects a temperature correlating with a decrease in a temperature of the vaporizer; and
   a controller that imposes restraint on a flow rate of the fuel flowing from the vaporizer to the prime mover when the temperature detected by the temperature detector is lower than or equal to a first temperature.

2. The working machine according to claim 1, comprising a display unit that indicates that the flow rate of the fuel flowing to the prime mover is restrained.

3. The working machine according to claim 1, wherein the controller includes a rotation speed limiting unit that limits an upper limit of a rotation speed of the prime mover so as to restrain the flow rate of the fuel flowing to the prime mover.

4. The working machine according to claim 1, wherein the controller includes an output limiting unit that limits an output of the prime mover so as to restrain the flow rate of the fuel flowing to the prime mover.

5. The working machine according to claim 1, wherein the controller includes a removing unit that removes the restraint when the temperature detected by the temperature detector is higher than or equal to a second temperature that is higher than the first temperature.

6. The working machine according to claim 1, wherein the controller includes a removing unit that removes the restraint after an elapse of a predetermined time since starting of the prime mover.

7. The working machine according to claim 1, wherein the temperature detector is a water temperature sensor that detects a temperature of cooling water for the prime mover.

8. The working machine according to claim 1, wherein the temperature detector is a gas temperature sensor that detects a temperature of the fuel vaporized by the vaporizer.

9. The working machine according to claim 1, comprising a hydraulic device that is driven by using a hydraulic fluid, wherein
the temperature detector is a fluid temperature sensor that detects a temperature of the hydraulic fluid.

10. The working machine according to claim 1, comprising:
a reserve tank that stores the fuel supplied from the fuel cylinder and that supplies the fuel to the prime mover when an amount of remaining fuel in the fuel cylinder decreases to a predetermined amount or less;
a remaining amount sensor that detects a state in which an amount of remaining fuel in the reserve tank reaches a predetermined amount; and
a notification unit that gives a notification about a decreasing change in a remaining fuel in a predetermined notification form after the remaining amount sensor has detected the state.

11. A working machine comprising:
a machine body;
a prime mover that is mounted on the machine body;
a fuel cylinder that contains a fuel to be supplied to the prime mover;
a reserve tank that stores the fuel supplied from the fuel cylinder and that supplies the fuel to the prime mover when an amount of remaining fuel in the fuel cylinder decreases to a predetermined amount or less;
a remaining amount sensor that detects a state in which an amount of remaining fuel in the reserve tank reaches a predetermined amount; and
a notification unit that gives a notification about a decreasing change in a remaining fuel in a predetermined notification form after the remaining amount sensor has detected the state, wherein
the remaining amount sensor is an ON/OFF sensor that outputs a binary value indicating that the amount of remaining fuel in the reserve tank has reached a predetermined amount or not, and
the notification unit gives a notification about a decreasing change in the remaining fuel in the predetermined notification form after the remaining amount sensor, which is the ON/OFF sensor, has outputted a binary value indicating that the amount of remaining fuel in the reserve tank has reached a predetermined amount.

12. The working machine according to claim 11, wherein the notification unit includes a notification control unit that changes the notification form in accordance with a driving time of the prime mover after the remaining amount sensor has detected the state.

13. The working machine according to claim 11, wherein the notification unit includes a notification control unit that calculates a fuel consumption after the remaining amount sensor has detected the state and that changes the notification form on the basis of the calculated fuel consumption.

14. The working machine according to claim 12, wherein the notification control unit changes the notification form step by step.

15. The working machine according to claim 1, comprising:
an elapsed-time totaling unit that totals a driving time of the prime mover after replacement of the fuel cylinder; and
a display that is capable of displaying the driving time totaled by the elapsed-time totaling unit.

16. A working machine comprising:
a machine body;
a prime mover that is mounted on the machine body;
a fuel cylinder of a replaceable type that contains a fuel to be supplied to the prime mover;
an elapsed-time totaling unit that totals a driving time of the prime mover after replacement of the fuel cylinder;
a display that is capable of displaying the driving time totaled by the elapsed-time totaling unit; and
a resetting unit that resets the driving time totaled by the elapsed-time totaling unit and display of the driving time.

17. The working machine according to claim 16, comprising
a reset switch that is operated by an operator, wherein
the resetting unit resets the driving time and display of the driving time in response to a predetermined operation being performed on the reset switch.

18. The working machine according to claim 16, comprising:
a reserve tank that stores the fuel supplied from the fuel cylinder and that supplies the fuel to the prime mover when an amount of remaining fuel in the fuel cylinder decreases to a predetermined amount or less; and
a remaining amount sensor that detects an amount of remaining fuel in the reserve tank reaching a predetermined amount, wherein
the resetting unit resets the driving time and display of the driving time in response to the remaining amount sensor detecting the amount of remaining fuel in the reserve tank being larger than or equal to the predetermined amount after replacement of the fuel cylinder.

19. The working machine according to claim 16, comprising
a replacement detector that detects replacement of the fuel cylinder, wherein
the resetting unit resets the driving time and display of the driving time in response to detection of replacement of the fuel cylinder.

20. The working machine according to claim 17, wherein the display includes a screen display part,
the screen display part is capable of switching display between a time display screen that displays the driving time and at least another display screen other than the time display screen, and
the driving time and display of the driving time are reset by the operator when not the at least another display screen but the time display screen is displayed.

* * * * *